Feb. 13, 1951     O. A. GROVE     2,541,242
EYESHIELD

Filed April 11, 1950     2 Sheets-Sheet 1

INVENTOR.
ORVILLE A. GROVE
BY
McMorrow, Berman & Davidson
ATTORNEYS

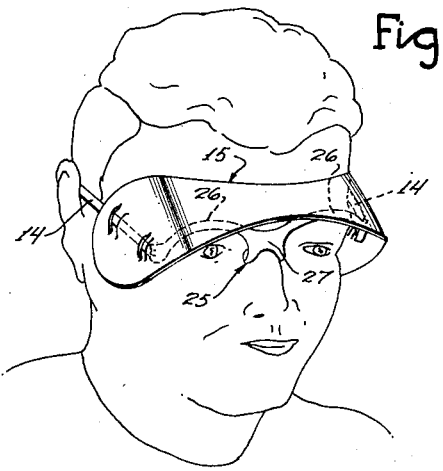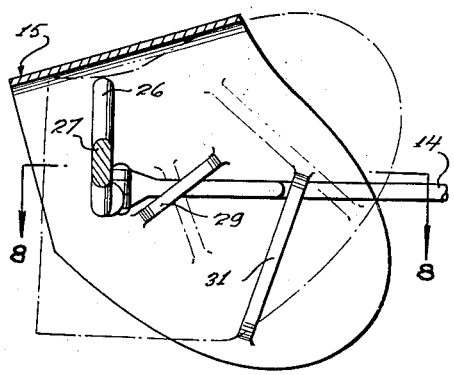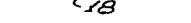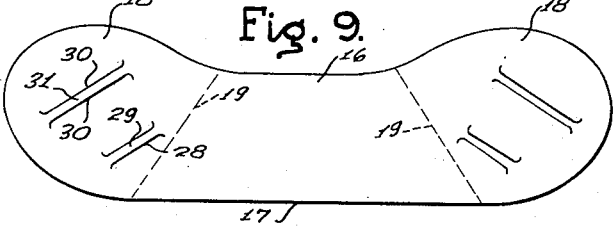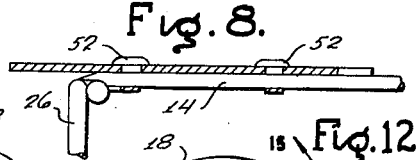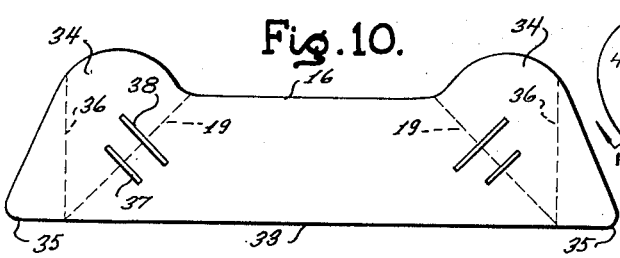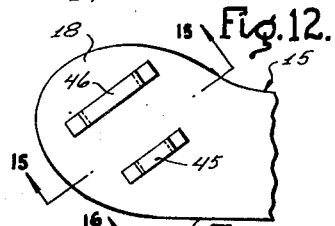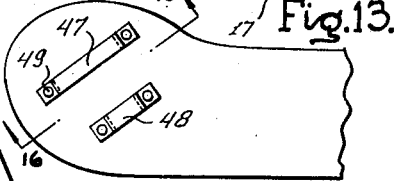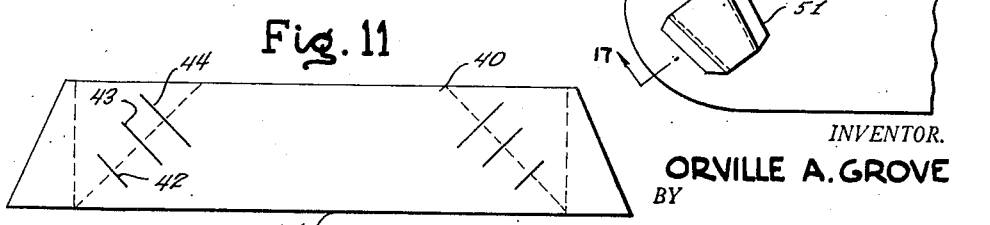

Patented Feb. 13, 1951

2,541,242

UNITED STATES PATENT OFFICE 2,541,242

EYESHIELD

Orville A. Grove, Long Beach, Calif.

Application April 11, 1950, Serial No. 155,244

8 Claims. (Cl. 2—13)

This invention relates to eye shields and more particularly to an improved one-piece adjustable eye shield attachable to a conventional pair of eye-glasses.

It is among the objects of the invention to provide an improved eye shield of simplified, unitary construction which can be quickly and easily installed on conventional eye-glasses or spectacles, which shield is easily adjustable to cover any desired portion of the field of vision of the wearer and may be positioned in front of the eyes to cover the entire field of vision or entirely above and to the sides of the eyes to modify light from above and to the rear of the eyes, is formed of a flexible, light-weight material so that it causes no discomfort or fatigue and may be formed of transparent material in order not to obscure any part of the field of vision of the wearer and may be colored or otherwise constructed to modify the light reaching the eyes, will fit eye-glass or spectacle frames of various shapes and sizes, and is neat and attractive in appearance and extremely economical to manufacture.

The material of the shield may be transparent and suitably colored to filter out the glare from sunlight or bright artificial lights, or may be translucent or opaque, as conditions may require.

Other objects and advantages will become apparent from a consideration of the following description and the appended claims in conjunction with the accompanying drawings, wherein:

Figure 6 is a perspective view of a human head wearing an assembly comprising an eye shield and a special carrying frame therefor;

Figure 7 is a medial transverse cross-section of the frame and eye shield assembly illustrated in Figure 6;

Figure 8 is a cross-section taken substantially on the line 8—8 of Figure 7;

Figure 9 is a development view of a modified form of eye shield;

Figure 10 is a development view of an additional modified form of eye shield;

Figure 11 is a development view of a still different modification of the eye shield;

Figure 12 is an inner side elevation of a fragmentary end portion of an eye shield showing a modified form of a frame attaching means;

Figure 13 is a view similar to Figure 12 showing a still further modification of frame attaching means;

Figure 14 is a view similar to Figures 12 and 13 showing a further modified form of frame attaching means;

Figure 15 is a transverse cross-section on the line 15—15 of Figure 12;

Figure 16 is a transverse cross-section on the line 16—16 of Figure 13; and,

Figure 17 is a transverse cross-section on the line 17—17 of Figure 14.

Figure 1:
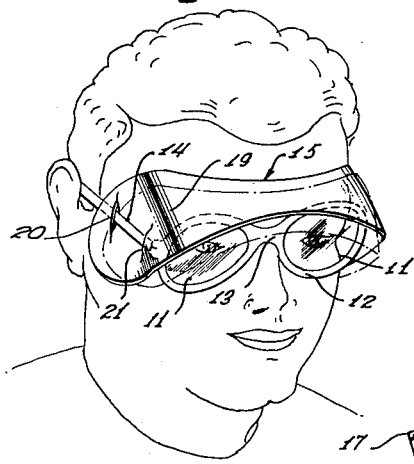
Figure 1 is a perspective view of a human head with an eye-glass and eye shield assembly worn thereon.

With continued reference to the drawings, and particularly to Figures 1 to 5 inclusive, the numeral 10 generally indicates a pair of eye-glasses or spectacles having lenses 11 and a frame including lens rings 12, a bridge or nose piece 13 and temple bars 14 each hinged at one end to the outer edge of a corresponding lens ring of the frame. The temple bars are conventionally provided at their opposite ends with ear hooks or inwardly curved flattened pads to engage the head of the wearer back of the ears to hold the glasses in proper position in front of the eyes. These eye-glasses or spectacles are of conventional construction and constitute no part of the present invention except in the operative assembly thereof with the novel eye shield generally indicated at 15.

The shield 15 comprises a piece of thin, flexible transparent sheet material such as a suitable synthetic resin plastic, a cellulose acetate material or material of any other suitable composition, and is preferably colored or otherwise manufactured in a manner to filter the light rays of the sun and protect the eyes of the wearer from glare.

Figure 2:
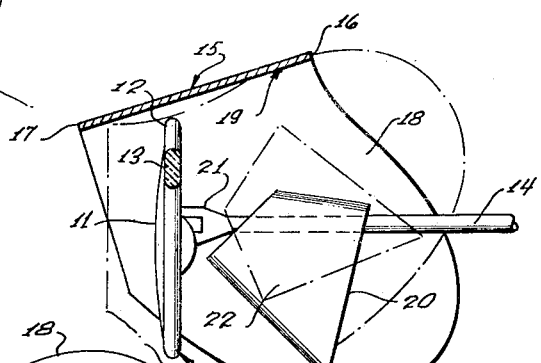
Figure 2 is a transverse medial cross-section of the eye-glass and eye shield assembly.
Figure 3:
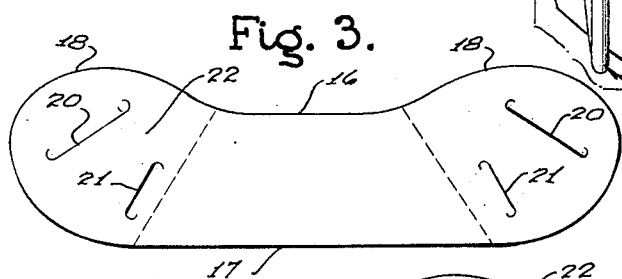
Figure 3 is a development view of the eye shield.
Figure 4:
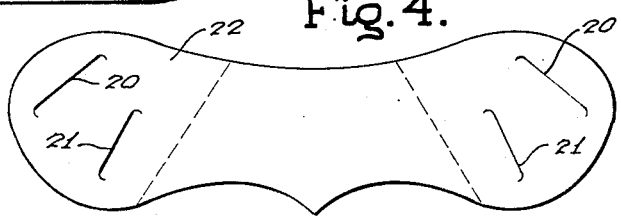
Figure 4 is a development of a somewhat modified form of eye shield.
Figure 5:
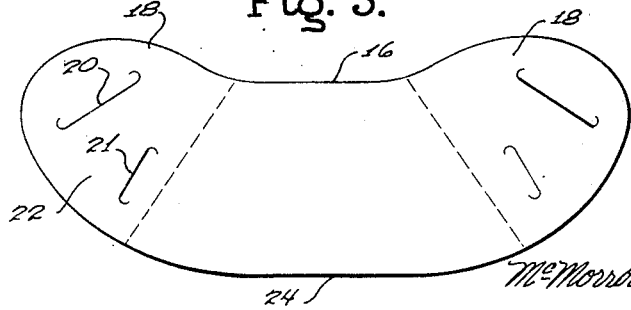
Figure 5 is a development view of a further modified form of eye shield.

The shield has substantially parallel inner and outer edges 16 and 17 and, in the form illustrated on Figures 3 to 5 inclusive, and Figure 9, has rounded end portions 18 which extend inwardly of the inner edge 16 at the opposite ends of the latter making the shield generally reniform in plan. When the shield is applied to a supporting frame, such as an eye glass frame as illustrated in Figures 1 and 2, it is longitudinally curved to a bowed condition.

Suitable means are provided near each end of the shield for attaching the shield to the frame of the eyeglasses 10 and such means conveniently comprise pairs of slits or cuts disposed one pair near each end of the shield, the corresponding temple bars 14 of the eyeglass frame being extended through the pairs of slits to secure the shield to the supporting frame.

In the forms of the shield illustrated in Figures 1 to 5 inclusive, the temple bar receiving slits 20 and 21 in each end portion 18 of the shield are disposed at acute angles to the longitudinal extent or the longitudinal center line of the piece of material constituting the shield. The slit 20 adjacent the corresponding end of the shield is longer than the corresponding slit 21 and the two slits of each pair are inclined relative to each other diverging in a downward direction when the shield is in operative position, as illustrated in Figure 1. This provides between the two slits 21 and 20 of each pair a portion 22 of trapezium shape separated at its ends from the material of the shield by the corresponding slits 20 and 21, the ends of this portion being disposed at different angles to the longitudinal extent of the shield and the end nearest the corresponding end of the shield being longer than the opposite end to render the shield adjustable on the eyeglass frame upon which it is mounted. The angles between the end portions 22 and the longitudinal center line of the shield may be varied within reasonable limits.

To mount the eye shield on the frame of a pair of eyeglasses the shield is bent over the top of the glasses, as is clearly illustrated in Figure 1, and each temple bar is passed through the slit 21 in the corresponding end of the shield and then through the slit 20 so that the temple bar is disposed between the portion 22 and the adjacent portions of the shield, the portion 22 constituting a pocket for the portion of the temple bar extending thereacross.

The length of the slits 20 and 21 permits adjustment of the shield in front of the eyeglasses or supporting frame between a position in which the shield is disposed almost entirely above and to the opposite sides of the eyeglass frame and clear of the field of vision of the wearer and a position in which it is disposed in front of the eyeglasses or equivalent supporting frame and covers the field of vision of the wearer. Thus with a shield of transparent material colored or otherwise treated to modify light passing therethrough to reduce or eliminate glare, under adverse conditions as when driving into the sun or being constrained to look toward the sun as in playing or observing games or other outdoor entertainment, the shield may be pulled down to its position, as indicated in dotted lines in Figure 2, covering the field of vision of the wearer. Under more favorable conditions the shield may be raised to the position illustrated in full lines in Figure 2 in which it is entirely clear of the field of vision of the wearer but extends forwardly from the wearer's forehead above the eyeglasses or other supporting frame to modify light directed downwardly toward the eyes of the wearer. Obviously the shade may be adjusted to any desired position between the two limiting positions described above. In all positions of adjustment the wide end portions of the shield cover the areas at the temple ends of the glasses to prevent back lighting of the eyeglass lenses. This feature is particularly valuable when the shield is worn with dark or sun glasses since it effectively prevents back lighting of the lenses of the glasses from the sides and top.

The length of the slits permits the full range of adjustment of the shield, as explained above, and the angular relationship of the slits is effective to hold the shield in various positions of adjustment against accidental displacement. The downwardly converging relationship of the two slits of each pair of slits provides sufficient resistance to downward movement of the shield that the shield must be manually pulled down and will not descend of its own weight.

The length of the slits and the spacing therebetween permits the use of one size of shield for glasses or frames of different sizes so that it is necessary to manufacture only one size of shield.

The three modifications of the eye shield illustrated in Figures 3, 4 and 5, are all similar in general construction. The shield shown in Figure 3 being of medium width and having substantially straight inner and outer edge portions generally parallel to each other. The shield shown in Figure 4 is narrower than the shield shown in Figure 3 to cover a proportionately smaller part of the upper portion of the wearer's field of vision and has its front edge provided with two adjacent concave recesses to enable the shield to fit around the upper portions of the two lens frames of a pair of eyeglasses. The shield shown in Figure 5 is wider than the shield of intermediate width shown in Figure 3 and has a substantially straight forward edge 24 which is generally parallel to the inner edge 16 but spaced outwardly therefrom a distance greater than the distance between the inner and outer edges 16 and 17 in the form shown in Figure 3, the rounded end portion 18 of the form shown in Figure 5 being extended outwardly so that their edges curve smoothly into the outwardly-extended outer edge 24 of the shield shown in Figure 5.

Figure 6 is similar to Figure 1 except that in the arrangement illustrated in Figure 6 a special frame, generally indicated at 25, is operatively associated with the shield, generally indicated at 15, instead of the conventional eyeglasses 10 illustrated in Figure 1.

The special frame 25 has no lenses but comprises a pair of upper half-rings 26 joined at their adjacent ends by a nose piece or bridge 27 and includes a temple bar 14 each hinged at one end to the outer end of a corresponding half-ring 26. This special frame may be provided as a component of a novel shield and frame assembly for persons who do not wear eyeglasses.

The shield 15 illustrated in Figure 6 may be any one of the forms shown in Figures 3 to 5 inclusive, or any of the forms shown in Figures 9 to 14 inclusive. Likewise, the shield 15 illustrated in Figure 1 may be any of the various modifications shown in the above noted figures.

The modified shield shown in Figure 9 is similar in shape to the form shown in Figure 3 and has spaced apart inner edges 16 and 17 and rounded end portions 18. In this shield, however, the attaching means for receiving the temple bars of the eyeglass frame, or of the special frame 25, are provided by making two pair of slits in each end portion 18 of the shield. One pair of slits 28 has substantially the same position as the slit 21 of Figure 3 and is effective to separate from the material of the eye shield a narrow strip 29 along the longitudinal edges of the strip. The other pair of slits 30 separates a narrow strip 31 along its longitudinal edges from the remainder of the shield so that a temple bar can be inserted between the strips 29 and 31 and the adjacent portions of the shield. The two strips are disposed at an acute angle to the longitudinal extent of the eye shield and are spaced apart and substantially parallel to properly position the eye shield on the supporting frame. The strip 31 nearest the end of the shield is longer than the inner strip 29 so that the shield can be adjusted to change its inclination outwardly and downwardly from the forehead of the wearer and thereby vary the amount of the upper part of the wearer's field of vision covered by the shield.

The modified form of the invention shown in Figure 10 is generally similar to that shown in Figure 3 except that the front edge 33 is continued straight for the entire length of the shield or visor and the end portions 34 are somewhat different shaped from the end portion 16, the end portions 34 coming more to a sharp corner at the end of the front ends 33, as indicated at 35, providing triangular end portions which are bent along the lines 36 out of the general plane of the end portions which are in turn bent out of the plane of the intermediate portion along the lines 19. In this case, the slits 37 and 38 are disposed at the opposite angular position relative to the front edge 33 from the slits 20 and 21 to the front edge 17 of Figure 3 and are also reversed in length, the longer slit 38 being the slit remote from the corresponding end of the shield. The slits 37 and 38 will, however, receive the temple bars of an eyeglass frame to support the shield in proper position above the eyeglasses and also provide for suitable adjustment of the inclination of the shield.

The form shown in Figure 11 is substantially the same as shown in Figure 10 except that both rear and front edges 40 and 41 are continued straight between the opposite ends of the shield and the ends of the shield are also straight and diverge from the inner edge 40 to the outer edge 41. In this case the shield is provided near each end with a group of three spaced-apart substantially parallel slits 42, 43 and 44 which are all inclined at an acute angle to the straight front edge 41 of the shield and increase successively in length from the slit 42 nearest the end of the shield to the slit 44 remote from the corresponding end of the shield. These three slits provide between them two strips which may be positioned at one side of an eyeglass frame temple bar while the portion of the shield adjacent the slit is positioned at the opposite side of the temple bar.

In the arrangement shown in Figures 12 and 15, instead of slitting the material of the shield to provide the strips 29 and 31 in Figure 9, two separate strips are secured at their ends to the inner surface of the shield and occupy the same relative position as the strips 29 and 31 of Figure 9. The intermediate positions of the strips 45 and 46 are spaced from the adjacent surface of the shield sufficiently to permit the corresponding temple bars of the eyeglass frame to pass between these strips and the shield.

In the modification shown in Figures 13 and 16, the strips 47 and 48 are the same as the strips 45 and 46 of Figures 12 and 15 but instead of being permanently attached to the inner surface of the shield are secured to the shield by detachable fasteners 49 of conventional construction.

If desired these strips 47 and 48 may be provided as flat spring tongues each secured at one end to the material of the shield so that they may be snapped over the corresponding temple bars of the eye glass frame to releasably secure the shield to the frame.

In the arrangement shown in Figures 14 and 17 a single piece of material 50 of trapezoidal shape is secured along its convergent edges to the inner surface of the shield, as indicated at 51 in a position such that its longer end is adjacent the corresponding end of the shield and both of its ends are inclined at an acute angle to the longitudinal extent of the shield or to the longitudinal center line thereof. The intermediate portion of this body is spaced from the shield to receive a corresponding temple bar of an eye-glass frame between its intermediate portion and the shield to adjustably support the shield in proper position on an eye-glass frame.

Another means of attaching the shield to the supporting frame comprises providing each temple bar with a pair of laterally projecting lugs or buttons 52 disposed opposite and extending through the corresponding slits 20 and 21 as particularly illustrated in Figures 7 and 8, to adjustably secure the shield to the temple bars of the frame.

It will be noted that while the intermediate portion of the shield is positioned above the eyes of the wearer and is inclined somewhat forwardly and downwardly to protect the eyes from direct glare, the end portions of the shield are bent downwardly at the temples and are effective to prevent back lighting from striking the eyes or the lenses of eye-glasses upon which the shield is supported. This is particularly useful where the shield is supported upon sun glasses as the shield prevents back lighting from striking the back surfaces of the lenses and being reflected into the eyes of the wearer causing discomfort and temporarily interfering with vision through the lenses of the glasses. The shield may be quickly applied to and removed from conventional glasses, or the special frames which may be provided for it, and may be formed of either transparent, translucent, or opaque material as the conditions under which it is worn may require.

The invention may be embodied in other specific forms without departing from the spirit or essential characteristics thereof. The present embodiments are, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. An eye shield comprising an elongated strip of flexible sheet material having adjacent each end thereof attaching means for receiving the corresponding temple bars of a supporting frame, such as the frame of a pair of eyeglasses, each of said attaching means comprising an open ended pocket with its ends disposed at different angles to the longitudinal extent of the shield and diverging downwardly when the shield is mounted in operative position, one end of said pocket being materially longer than its opposite end.

2. An eye shield mountable on an eyeglass frame comprising an elongated body of flexible material having a uniform shape in plan and provided near each end with a pair of slits for receiving a temple bar of a supporting frame, the two slits of each pair being spaced apart and having a length such that the shield can be moved from a position above a shield supporting frame in which the shield is entirely clear of the field of vision of the wearer thereof and a position in which it is disposed in front of the supporting frame and covers the field of vision of the wearer, the two slits of each pair being angularly related to impose on the corresponding temple bars of a supporting frame frictional resistance to downward movement of the shield.

3. An eye shield comprising an elongated strip of flexible sheet material having adjacent each end thereof attaching means for receiving the corresponding temple bars of a supporting frame, such as an eyeglass frame, each of said attaching means comprising two spaced apart slits in the material of said shield, both of said slits being disposed at different angles to the longitudinal extent of said shield to properly position the shield on a supporting frame with the temple bars of the frame passing through said slits, and the slits adjacent the corresponding ends of said shield being longer than the complementary slits to render said shield adjustable relative to the supporting frame upon which it is mounted.

4. An eye shield comprising an elongated strip of flexible sheet material having adjacent each end thereof attaching means for receiving the corresponding temple bars of a supporting frame, such as an eyeglass frame, each of said attaching means comprising a portion of trapezium shape of the material of said shield separated at its ends from the material of the shield and having its ends disposed at different angles to the longitudinal extent of the shield to properly position the shield on the supporting frame with a temple bar of said frame extending between said portion and the adjacent portion of said shield, the end of said portion adjacent the corresponding end of said shield being longer than the opposite end to render said shield adjustable relative to the supporting frame upon which the shield is mounted.

5. An eye shield comprising an elongated strip of flexible sheet material having adjacent each end thereof attaching means for receiving the corresponding temple bars of a supporting frame such as an eyeglass frame, each of said attaching means comprising two spaced apart, narrow strips separated along their longitudinal edges from the material of said shield and disposed at different angles to the longitudinal extent of the shield to properly position the shield on a supporting frame with the temple bars of the frame extending between said strips and the adjacent portions of the shield, the strip of each attaching means nearest the end of the shield being longer than the other strip of the frame attaching means to render said shield adjustable relative to the frame upon which it is supported.

6. An eye shield comprising an elongated strip of flexible sheet material having adjacent each end thereof attaching means for receiving the corresponding temple bars of a supporting frame, such as an eyeglass frame, said attaching means each comprising a piece of thin material secured at opposite sides to said shield and spaced from the latter to receive a temple bar of a supporting frame between such piece of material and the shield, said piece of material having its ends disposed at different angles to the longitudinal extent of the shield to properly position the shield on a supporting frame, and having its end adjacent the corresponding end of said shield longer than its opposite end to render said shield adjustable relative to the frame upon which it is supported.

7. An eye shield comprising an elongated strip of flexible sheet material having adjacent each end thereof attaching means for receiving the corresponding temple bars of a supporting frame, such as the frame of a pair of eyeglasses, each of said attaching means comprising an open ended pocket with its ends disposed at different angles to the longitudinal extent of the shield and with one end materially longer than its opposite end, said shield having enlarged end portions disposed at an angle to the intermediate portion thereof to overlie the temples of the wearer of the shield and prevent back lighting from striking the rear surfaces of eyeglass lenses carried by the shield supporting frame.

8. An eye shield comprising an elongated strip of thin flexible material of light filtering or light obstructing character having attaching means adjacent each end thereof for receiving the corresponding temple bars of a supporting frame, such as an eyeglass frame, each of said attaching means comprising two spaced apart slits in the material of said shield providing between them a strip overlying the corresponding temple bar and disposed at different angles to the longitudinal center line of said shield and so disposed that the inner slit of each attaching means impinges the corresponding temple bar hinge to hold the shield against outward movement relative to the frame, the outer slit of each attaching means being longer than the corresponding inner slit to provide freedom of tilting movement of adjustment of the shield relative to the supporting frame.

ORVILLE A. GROVE.

No references cited.